United States Patent [19]

Lewis, Jr.

[11] Patent Number: 4,531,149
[45] Date of Patent: Jul. 23, 1985

[54] DIGITAL VARIABLE GROUP DELAY EQUALIZER FOR A DIGITAL TELEVISION RECEIVER

[75] Inventor: Henry G. Lewis, Jr., Hamilton Square, N.J.

[73] Assignee: RCA Corporation, Princeton, N.J.

[21] Appl. No.: 507,458

[22] Filed: Jun. 24, 1983

[51] Int. Cl.³ ............................................. H04N 5/04
[52] U.S. Cl. ...................................... 358/31; 358/39; 358/325; 358/326
[58] Field of Search .................. 358/13, 31, 21 R, 39, 358/325, 326; 360/36.1

[56] References Cited

U.S. PATENT DOCUMENTS

| | | | |
|---|---|---|---|
| 4,018,990 | 4/1977 | Long et al. | 358/19 |
| 4,051,519 | 9/1977 | Harwood | 358/21 |
| 4,135,105 | 1/1979 | Stange | 307/225 |
| 4,219,838 | 8/1980 | Rossi | 358/21 R |
| 4,230,953 | 10/1980 | Wilcox | 307/230 |
| 4,297,641 | 10/1981 | Sterzer | 328/15 |

OTHER PUBLICATIONS

E. Lerner, "Digital TV: Makers Bet on VLSI", IEEE Spectrum, 2/83, pp. 39-43.
TRW LSI Product Data Sheet—Model TDC1016J, Monolithic Video D/A Converters, 6/79.
B. Amazeen et al., "Monolithic d-a Converter Operates on Single Supply," Electronics, Feb. 28, 1980, pp. 125-131.

Primary Examiner—John W. Shepperd
Attorney, Agent, or Firm—E. M. Whitacre; P. J. Rasmussen; E. P. Herrmann

[57] ABSTRACT

Digital TV receivers which digitally process chroma and luma signals in different channels and convert the digital signals to analog form before matrixing will include low pass analog filters after the DAC's to remove clock switching components. The luma and chroma analog filters will impose differing group delay on their respective signals. This creates a differential phase error between the analog signals which is corrected by predictively delaying the signal which leads in phase in the DAC. This is accomplished by using clocked digital-to-analog converters forced to operate synchronously with the data stream and appropriately delaying the clock signal applied to one of the DAC's relative to the other.

6 Claims, 4 Drawing Figures

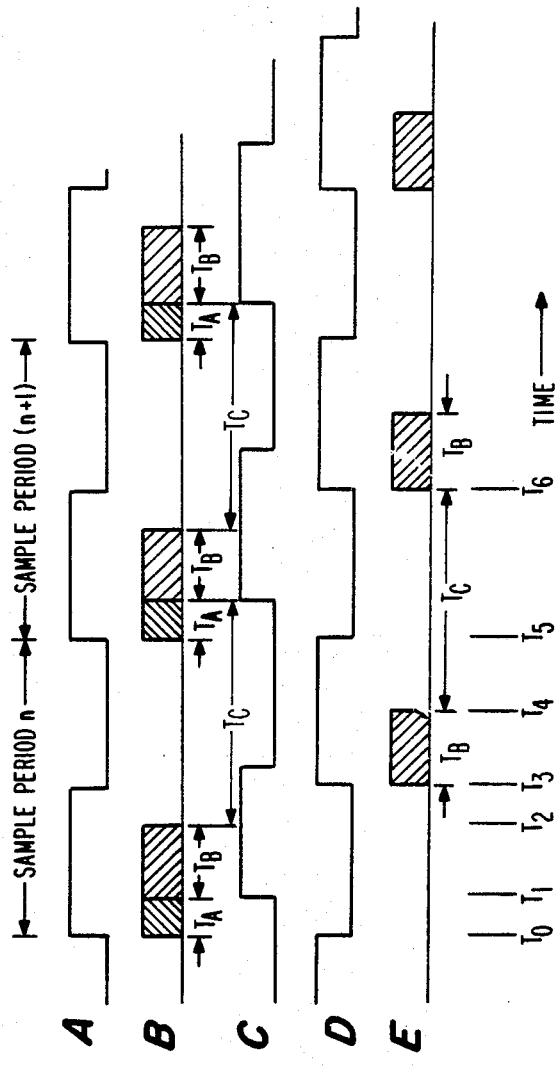
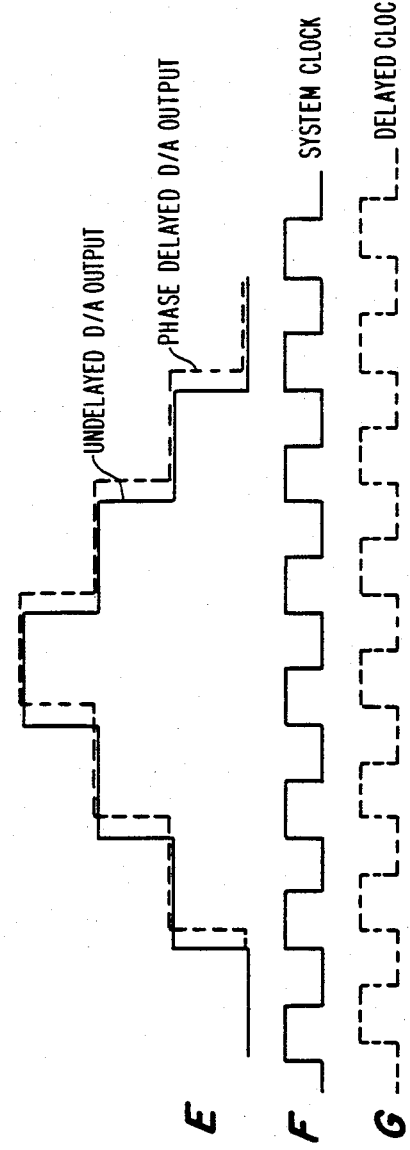
Fig. 2A
Fig. 2B

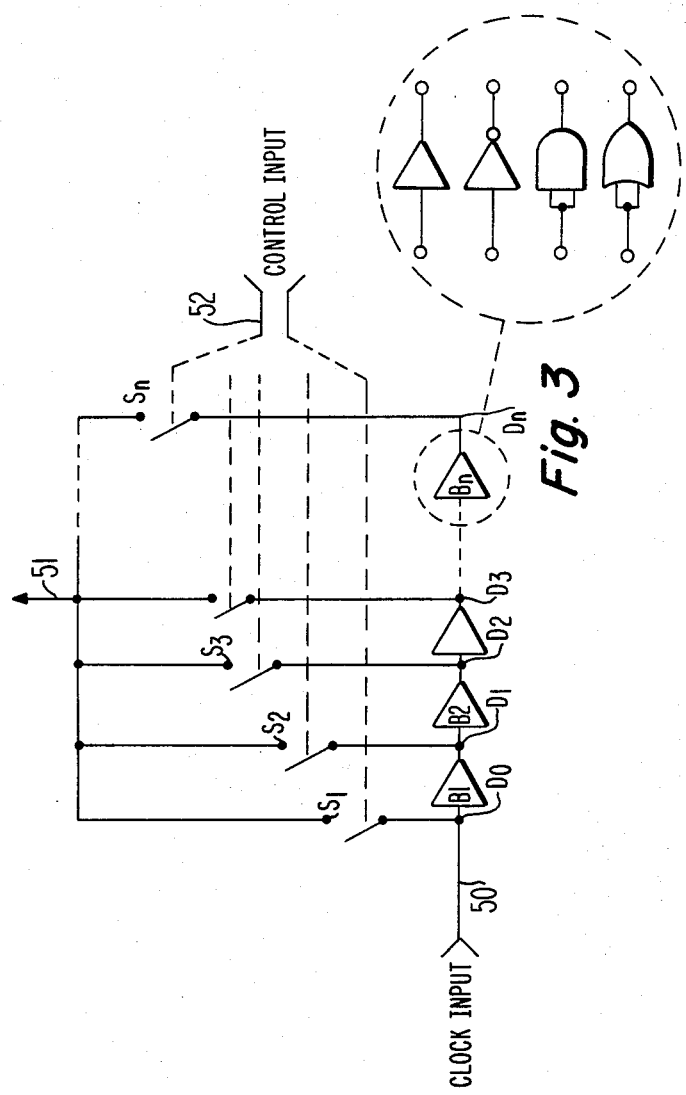

DIGITAL VARIABLE GROUP DELAY EQUALIZER FOR A DIGITAL TELEVISION RECEIVER

This invention relates to luminance and chrominance signal phase equalization in a digital TV receiver.

Currently TV receivers are being designed which will process composite video from a standard IF section by digital techniques. As in analog receivers the chrominance and luminance components are separated for processing and signal enhancement, and then recombined in matrixing circuitry to generate red, blue and green (RGB) color signals to drive the display tube. Circuitry to perform matrixing in the digital domain tends to require a relatively large number of circuit elements compared with analog matrices. Thus present digital TV systems reconvert the chrominance and luminance signals from digital form to analog form before matrixing, and use traditional analog matrix circuits (see for example E. Lerner "Digital TV: Makers Bet on VLSI", IEEE Spectrum, February 1983, p. 39–43). The reconverted analog signals will generally include superimposed clock or switching signal components. These switching components are eliminated by low pass filtering the respective analog signals before matrixing. The chrominance and luminance signals have different bandwidths and therefore filters with different spectral characteristics are used in the respective signal processing paths. The different filters may exhibit different group delays which can undesirably misalign the phase relationships of the analog chrominance and luminance signals applied to the matrix. It is well known by TV designers that the phases of the processed chrominance and luminance signals must be maintained in a particular relationship to successfully matrix the signals. It is therefore necessary to have facility in the receiver to compensate for differential group delays exhibited by the low pass analog filters which precede the analog matrix circuitry.

SUMMARY OF THE INVENTION

The present invention performs differential chrominance and luminance phase compensation by adjusting the timing of the digital-to-analog conversion of the digitally processed chrominance and luminance signal. Nominally the digital signals which are applied to the digital-to-analog converters (DAC's) are stable for a substantial portion of the processed data sample period, i.e., the system clock period. This provides a range of time over which the data can be strobed into the DAC making possible incremental phase adjustments to the signal. Strobe phasing is performed by generating a plurality of system clock phases and multiplexing the appropriate one to the DAC strobe control. Larger incremental timing adjustments or phasing is performed by including clocked register stages in the respective signal path.

BRIEF DESCRIPTION OF THE DRAWINGS

FIGS. 2A and 2B are timing diagrams illustrating the effect delaying the signal to a DAC has on its analog output signal; and FIG. 3 is a schematic diagram of circuitry for generating a clock signal of selectable phase.

DETAILED DESCRIPTION

Figure 1:
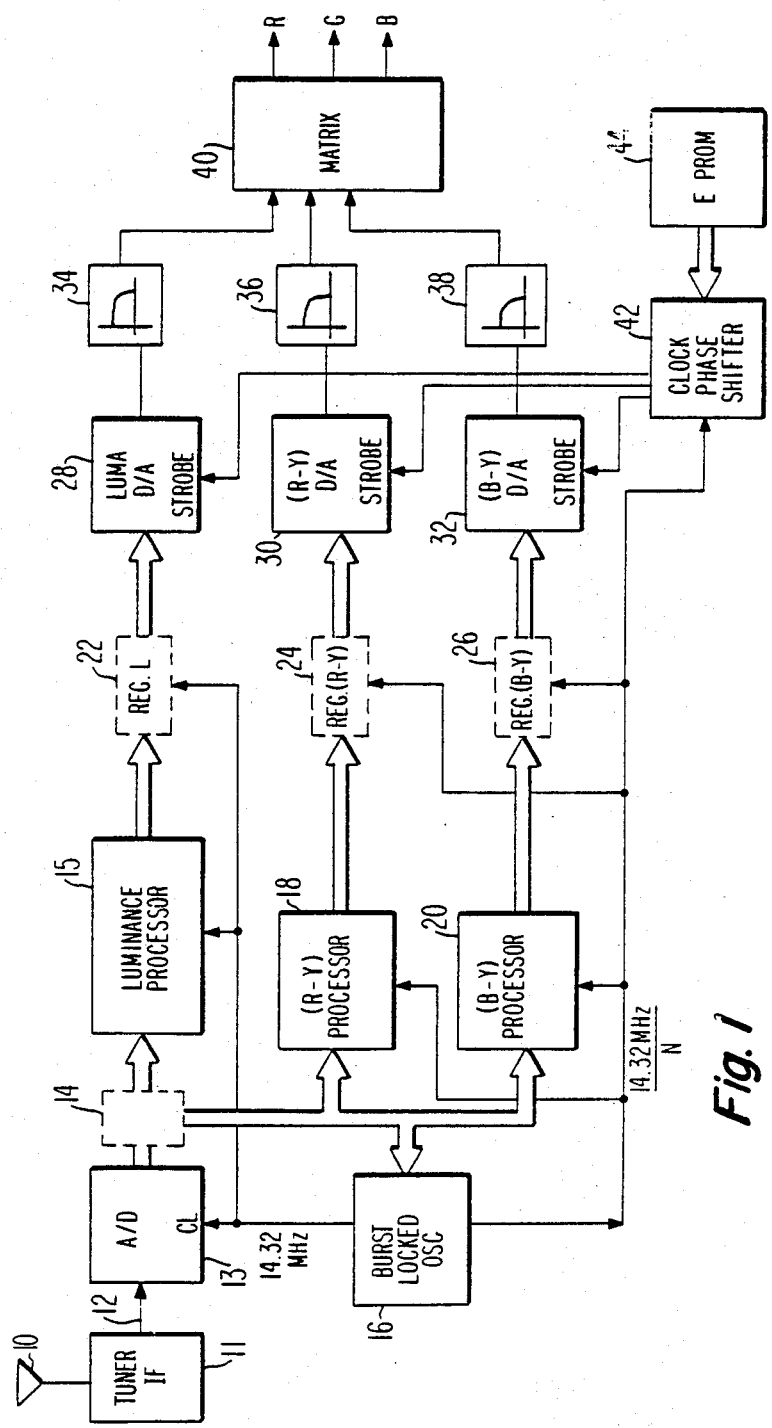
FIG. 1 is block diagram of a digital TV receiver including circuitry for adjusting the phase of digital signals to precompensate for phase differences produced by analog filters after D-to-A conversion.

FIG. 1 is a block diagram showing the general video signal processing paths in a digital TV receiver. In the FIGURE, a conventional analog tuner and IF circuit 11 receives broadcast signals from the antenna 10 and produces baseband composite video at its output 12. The baseband video is sampled and converted to digital form e.g. two's complement binary pulse code modulated signals, by analog-to-digital converter (ADC) 13 which is clocked at a sample rate of e.g., four times the color subcarrier frequency or 14.32 MHz. The clocking signal is generated by oscillator circuit 16 which is phase locked to the color burst reference of the video signal. The embodiment shows the oscillator coupled for receiving digital samples of the burst signal but it may have been connected directly to the IF output 12.

The digital manifestation of composite video from ADC 13 is separated into its luminance and chrominance components by for example, a comb filter 14. The luminance component is appropriately processed by digital techniques in circuitry 15. The color mixture signal components for example (R-Y) and (B-Y) signals, of the chrominance component of the composite video are suitably processed in circuits 18 and 20. The processed luminance and chrominance signal components are respectively applied to DAC's 28, 30 and 32 which convert the processed digital signals to analog signals. These analog signals are then low pass filtered in analog filters 34, 36 and 38. The low pass filtered luminance and chrominance signals are combined in analog matrix 40 which develops the RGB signals.

Normally the processing of the luminance and chrominance signals will be performed synchronously with the system clock. However because the bandwidth of the color mixture signals is considerably less than the luminance bandwidth, the color mixture signal samples may be decimated/interpolated for processing at a lower sample rate. The lower sample rate will be a submultiple of the ADC sampling rate and generated by counting down the ADC sampling clock in circuit 16.

The signal processing functions performed on the luminance signals differ from those performed on chrominance signals. This may result in differential delays between the processed luminance and chrominance components. The differential delay will be an integer multiple of system sample periods for a synchronous processing system. The differential delay may be corrected by interposing clocked delay stages, e.g. shift registers in the path of the signal which leads in phase. Elements 22, 24 and 26 indicate the possible location for such registers to compensate for the integer sample differential phase or delay.

There may also be integer sample differential phase delay between the respective color mixture signals. This delay may be compensated by appropriate adjustment of the number of delay stages between delay registers 24 and 26.

Next consider filters 34, 36 and 38. The luminance signal has a bandwidth of approximately 4 MHz and thus filter 34 will have a 3 dB cutoff of about 4 MHz. (R-Y) and (B-Y) signals typically have bandwidths of less than 1 MHz and the filters 36 and 38 will have appropriately corresponding cutoff frequencies. Those skilled in the art of filter design will readily recognize that low pass analog filters with significantly different cut off frequencies will exhibit different group delay. In the circuit of FIG. 1, different group delays between filters 36/38 and 34 will introduce differential phase delay between the luminance and chrominance components at the matrix 40. If the differential phase delay is greater than a sample period it may be coarsely compensated by introducing further delay stages in register 22 or register 24/26. That is, if due to filters 34, 36 and 38 the luminance leads the chrominance (relative to the luminance-chrominance phase relationship at 12), delay stages may be added to delay register 22 to predelay the luminance signal prior to filtering, resulting in a coarse phase realignment at the input to the matrix. If the differential phase delay is less than a sample period, fine phase adjustment may be made by adjusting the phase of the DAC timing control.

The basic parallel-input DAC has the property that the analog output continually reflects the state of the logic inputs. If the basic conversion circuitry is preceded by a latch, which may be integral with the DAC or separate therefrom, the device will respond only to the input signals gated or strobed into it. This property is especially useful in data systems in which data is continuously appearing, but it is desired that the DAC respond at particular times, then hold the analog output constant until the next strobe pulse. In this sense the DAC preceded with the input latch may be viewed as a sample-and-hold circuit with digital input, analog output and conceivably infinite hold time. Examples of such DAC's are the TRW Corporation TDC1016J "Monolithic Video D/A Converter", the Sony Corporation "CX20051A 10-Bit D/A Converter", and see B. Amazeen et al., "Monolithic d-a converter operates on single supply", Electronic, Feb. 28, 1980, pp. 125–131.

Referring to FIG. 2A waveform A is an amplitude versus time waveform of the system clock, the period of which is equal to the reciprocal of the digital sample rate. Consider that between circuit elements, e.g., register 26 and DAC 32, data samples change responsive to the positive going transitions of the clock. A finite time, TA, is required for the samples to assume a new correct value (waveform B). Consider also that the DAC includes an input data latch controlled by a strobe input signal, and that the DAC conversion time is equal to TB. Nominally the strobe pulse cannot be applied until correct data is present at the DAC data input terminals (at or after time $T_1$ for sample period n). For the strobe control clocked at time $T_1$ (waveform C) a correct analog amplitude will appear at the output of the DAC at time $T_2$ and remain for the period TC after which a new conversion is initiated.

Shifting the phase of the strobe clock pulse (waveform D) has the effect of delaying the output sample. For the example shown where the leading edge of the control clock is delayed from time $T_1$ to time $T_3$, the converted output sample is delayed from time $T_2$ to time $T_4$ (waveform E) or 135 degrees of the clock signal. Note that the leading edge of the strobe clock can be varied anywhere during the interval between $T_1$ and $T_5$ affording considerable delay phase adjustment to the output signal.

Next consider FIG. 2B. Assume waveform F is the strobe signal applied to DAC 30 and waveform G is the strobe signal applied to DAC 28. Assume also that identical digital signals corresponding to the sampled data analog signal of waveform E, are applied to the signal input terminals of DAC's 28 and 30. The solid waveform in E represents the analog output signal of DAC 30. The broken line waveform E represents the analog output signal of DAC 28. The signal from DAC 28 is delayed from the signal from DAC 30 by an amount equal to the delay of strobe signal G relative to strobe signal F. Thus it can be seen that the phasing of two signals provided from separate DAC's can be differentially adjusted by phase adjustement of the respective strobe pulses. The amount of possible phase adjustment corresponds to the portion of the sample period over which valid data is applied to the input of the DAC's.

FIG. 3 illustrates apparatus for generating a strobe pulse selectable in discrete phase increments relative to the system clock. The apparatus consists of a plurality, n, of cascaded digital buffer circuits $B_i$ each having similar input-output or gate delay characteristics. The inset shows a number of different logic gates which may be used for the buffer circuits $B_i$ and which include standard inverters, AND gates and OR gates, etc. The output signal of each buffer is a replica of its input signal but delayed in time by e.g., 5 ns or complemented and delayed. The delay from input 50 to which the system clock is applied, and the delay at any particular buffer output, is cumulative with the delay of the intervening buffers. The output $D_i$ of the different buffer stages is selectably applied to the phase adjusted clock output 51 via switches $S_1$–$S_n$. If switch $S_1$ is closed output $D_o$ is coupled to terminal 51 and the system clock is applied to terminal 51 without any added delay. If switch $S_3$ is closed, the system clock at 50 is applied to terminal 51 delayed by the gate delays of buffer B1 plus buffer B2 etc.

The switches are selectably closed to the exclusion of all others by control inputs 52 which may be manual controls or electronic controls as for example output signals from a memory device (44).

Referring back to FIG. 1, the clock phase shifter 42, which applies the strobe pulses to establish the conversion timing of DAC's 28, 20 and 32, may consist of several of the FIG. 3 circuits. During manufacture the incremental phase delay required to phase align the luminance and chrominance signals would be determined and information required to close the appropriate switches (FIG. 3) stored in an appropriate control device as for example as electrically programmable ROM or EPROM 44 which would thereafter control the clock phase shifter 42. The electrically programmable control element is particularly desirable for those systems which have facility to periodically self-calibrate.

Note differential delays large enough to require register delay stages as for example in register 22 or register 24 would normally be known from design calculations and the extra stages included in the design before manufacture.

Lastly, consider apparatus which time division multiplexes two different digital signals (i.e., the (R-Y) and (B-Y) signals of FIG. 1) to the input of a single DAC e.g., 32 and then demultiplexes them via two analog sample and hold signals at the output of the DAC. The phase of the first signal can be adjusted with respect to the second signal by adjusting the duty cycle of the pairs of the strobe pulses applied to the DAC. In this arrangement, every other strobe pulse addresses one signal (R-Y) and the intervening pulses the other signal (B-Y). Thus if the period of one of the pulses is adjusted inversely with respect to adjacent pulses the phase of one of the multiplexed-demultiplexed signals will be altered with respect to the other. Alternatively the phases of the two signals may be differentially adjusted by the clock phases of the demultiplexing clocks. In this instance one of the demultiplexing clocks may sample its respective analog signal immediately after digital to analog conversion while the alternate clock would sample the alternate analog signal sample at the appropriate time in the interval after conversion.

What is claimed is:

1. In a video signal processing system including a digital luminance signal processing path and a digital chrominance signal processing path, each of said processing paths operating synchronously with a reference signal and including in cascade arrangement a digital to analog converter and further analog processing circutry, means for differentially adjusting the phase of the analog luminance signal with respect to the analog chrominance signal comprising:

means for generating a clock signal synchronous with said reference signal and having a selectable phase relation therewith; and means responsive to said selectable phase clock signal for strobing digital signals into at least one of said digital-to-analog converters thereby delaying the analog output signal from said one of said digital-to-analog converters relative to the other.

2. The apparatus set forth in claim 1 further including:

digital delay means in cascaded arrangement ahead of one of said digital-to-analog converters for delaying the digital signals by integral sample periods and thereby the analog output signal from said converter.

3. The apparatus set forth in claim 1 wherein the means for generating the selectable phase clock signal includes:

a plurality of buffer circuits connected in cascade input to output;

means for connecting the firstmost buffer circuit of said cascade arrangement to receive said reference signal;

a source of phase selection control signals; and switch means responsive to said phase selection control signals for selecting signal from a particular one of said plurality of buffer circuits.

4. The apparatus set forth in claim 3 wherein said source of phase selection control signals is a memory element.

5. In a TV system which digitally processes two components of video signal in separate digital signal processing paths, and converts the two processed digital signals to analog signals for further processing in one or more digital-to-analog converters, said separate digital signal processing paths operating synchronously with respect to a reference signal, the method of differentially adjusting the phase of the analog signals comprising:

operating said digital-to-analog converters synchronously with said reference signal responsive to synchronizing signals; and selectably adjusting the phases of the synchronizing signals relative to said reference signal.

6. The method set forth in claim 5 wherein selectably adjusting the phases of the synchronizing signals comprises:

successively delaying said reference signal in cascaded logic gates;

selecting an output from one of said respective logic gates for applying as a synchronizing signal.

* * * * *